(12) United States Patent
Yu

(10) Patent No.: US 7,656,470 B2
(45) Date of Patent: Feb. 2, 2010

(54) BACKLIGHT MODULE WITH LIGHT GUIDE PLATE HAVING FIRST EAR (TAB) WITH STRUCTURE FOR HOLDING SECOND EAR OF OPTICAL FILM LOCALIZED (LOCKED) BY THE FIRST EAR AND LCD FOR SAME

(75) Inventor: Chih-Chia Yu, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 426 days.

(21) Appl. No.: 11/636,061

(22) Filed: Dec. 7, 2006

(65) Prior Publication Data

US 2007/0126947 A1    Jun. 7, 2007

(30) Foreign Application Priority Data

Dec. 7, 2005    (CN) .................... 2005 1 0102307

(51) Int. Cl.
*G02F 1/1333* (2006.01)

(52) U.S. Cl. ..................... 349/58; 349/62; 362/615; 362/628; 362/633; 362/634

(58) Field of Classification Search ............. 349/58–71; 362/615, 632–634, 628
See application file for complete search history.

(56) References Cited

U.S. PATENT DOCUMENTS

| 4,874,227 | A * | 10/1989 | Matsukawa et al. ........... 349/73 |
| 6,961,103 | B2 | 11/2005 | Sung |
| 2005/0195621 | A1 * | 9/2005 | Chang et al. ................ 362/634 |
| 2005/0259444 | A1 | 11/2005 | Choi |

FOREIGN PATENT DOCUMENTS

| JP | 2005302485 | 9/2004 |
| TW | 232987 | 11/2004 |

* cited by examiner

*Primary Examiner*—John Heyman
(74) *Attorney, Agent, or Firm*—Wei Te Chung

(57) ABSTRACT

An exemplary backlight module (11) includes a frame (17), and a light guide plate (16) received in the frame. The frame includes a supporting board (170) defining a notch (174) therein. The light guide plate includes a light incident surface (160), a side surface (166), and a first ear (168) outwardly extending from the side surface. The first ear is received in the notch, and a top surface of the first ear is coplanar with a top surface of the supporting board at the notch.

11 Claims, 7 Drawing Sheets

BACKLIGHT MODULE WITH LIGHT GUIDE PLATE HAVING FIRST EAR (TAB) WITH STRUCTURE FOR HOLDING SECOND EAR OF OPTICAL FILM LOCALIZED (LOCKED) BY THE FIRST EAR AND LCD FOR SAME

FIELD OF THE INVENTION

The present invention relates to backlight modules such as those used in liquid crystal displays (LCDs), and more particularly to a backlight module that includes a light guide plate having an ear portion for secure engagement of the light guide plate in the backlight module.

GENERAL BACKGROUND

Liquid crystal displays are commonly used as display devices for compact electronic apparatuses, because they not only provide good quality images but are also very thin. Because liquid crystal in a liquid crystal display does not emit any light itself, the liquid crystal has to be lit by a light source so as to clearly and sharply display text and images. Therefore, liquid crystal displays typically require a backlight module.

Referring to FIG. 11, a typical backlight module 80 includes a frame-shaped piece of double-sided adhesive masking tape 81, a first brightness enhancement film (BEF) 82, a second BEF 83, a diffusing film 84, a light guide plate 85, and a plastic frame 86, arranged generally in that order from top to bottom. The backlight module 80 further includes a plurality of light emitting diodes (LEDs) 87 disposed adjacent to a light incident surface 852 of the light guide plate 85.

The light guide plate 85 further includes a light emitting surface 854 perpendicularly connected with the light incident surface 852, and two opposite side surfaces 856 perpendicularly connected with both the light incident surface 852 and the light emitting surface 854. A pair of ears 858 outwardly extends from the each of side surfaces 856. Top surfaces (not labeled) of the ears 858 are coplanar with the light emitting surface 854. The first BEF 82, the second BEF 83, and the diffusing film 84 are generally rectangular, and have a same size corresponding to a size of the light emitting surface 854. The plastic frame 86 includes a frame-shaped supporting board 860. A pair of notches 862 is defined in an inner wall of each of two opposite long sides of the supporting board 860.

The light guide plate 85 is generally made to be very thin in order that the backlight module 80 can be compact. On the other hand, the plastic frame 86 needs to have a minimum thickness in order to provide the backlight module 80 with sufficient mechanical strength. Thus when the backlight module 80 is assembled, the light guide plate 85 is received in the plastic frame 86. The ears 858 of the light guide plate 85 are respectively received in the notches 862 of the supporting board 860. In general, a gap exists between the top surface of each of the ears 858 and a top surface of the supporting board 860. The masking tape 81 is then adhered to top edge portions of the supporting board 860 and adjacent peripheral edge portions of the first BEF 82. Thus the gap is defined between the top surface of each of the ears 858 and the masking tape 81. That is, portions of the masking tape 81 over the notches 862 of the supporting board 860 are not utilized in providing adhesion between the supporting board 860 and the first BEF 82. This means the mechanical stability of the backlight module 80 may be compromised.

What is needed, therefore, is a backlight module that can overcome the above-described deficiencies. What is also needed is a liquid crystal display including the backlight module.

SUMMARY

In one preferred embodiment, a backlight module includes a frame, and a light guide plate received in the frame. The frame includes a supporting board defining a notch therein. The light guide plate includes a light incident surface a side surface, and a first ear outwardly extending from the side surface. The first ear is received in the notch, and a top surface of the first ear is coplanar with a top surface of the supporting board at the notch.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred embodiments of the present invention in detail.

Figure 1:
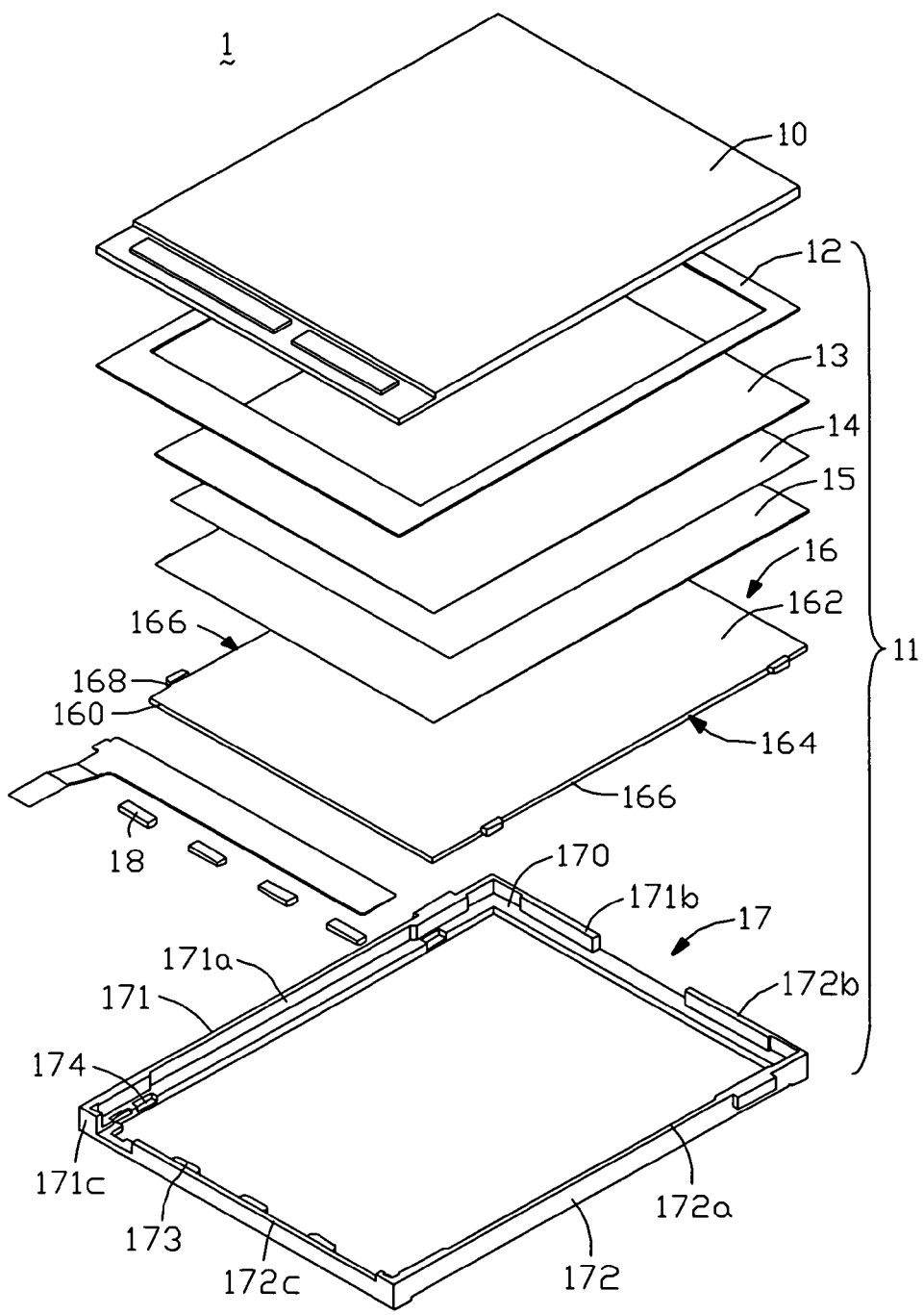
FIG. 1 is an exploded, isometric view of a liquid crystal display according to a first embodiment of the present invention, the liquid crystal display including a liquid crystal panel and a backlight module, the backlight module including a frame-shaped piece of masking tape.

Referring to FIG. 1, a liquid crystal display 1 according to a first embodiment of the present invention is shown. The liquid crystal display 1 includes a liquid crystal panel 10, and a backlight module 11 located adjacent to the liquid crystal panel 10.

The backlight module 11 includes a frame-shaped piece of double-sided adhesive masking tape 12, a first BEF 13, a second BEF 14, a diffusing film 15, a light guide plate 16, and a frame 17, arranged generally in that order from top to bottom. The backlight module 11 further includes a plurality of illuminators 18 located at a flexible printed circuit (not labeled) thereof. In the illustrated embodiment, the illuminators 18 are four light emitting diodes. The masking tape 12, the first BEF 13, the second BEF 14, the diffusing film 15, the light guide plate 16, and the illuminators 18 are received in the frame 18. The masking tape 12 has a size corresponding to that of the liquid crystal panel 10, and defines a center window (not labeled) for allowing light beams exiting the first BEF 13 to pass through to the liquid crystal panel 10. The first BEF 13, the second BEF 14, and the diffusing film 15 are generally rectangular.

The light guide plate 16 includes a light incident surface 160, a light emitting surface 162, a bottom surface 164, and two opposite side surfaces 166. The light incident surface 160 is adjacent to the illuminators 18. The light emitting surface 162 is perpendicularly connected with the light incident surface 160. The bottom surface 164 is opposite to the light emitting surface 162. The side surfaces 166 are perpendicularly connected with the light incident surface 160, the light emitting surface 162, and the bottom surface 164. That is, the light incident surface 160 and the side surfaces 166 are between the light emitting surface 162 and the bottom surface 164. The diffusing film 15 is disposed adjacent to the light emitting surface 162 of the light guide plate 16.

Figure 3:
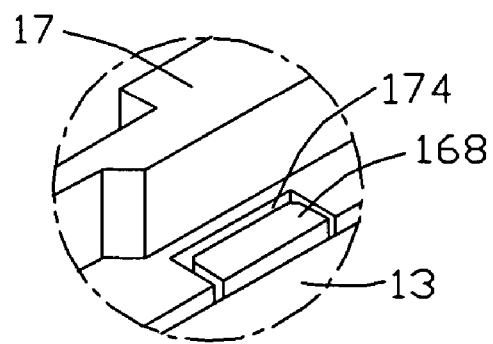
FIG. 3 is an enlarged view of a circled portion III of FIG. 2.

A pair of ears 168 extend perpendicularly outwardly from each side surface 166 of the light guide plate 16. The ears 168 are near end portions (not labeled) of the respective side surfaces 166. In the illustrated embodiment, each ear 168 has the shape of a block. Referring also to FIG. 3, two vertical corner portions (not labeled) of the ear 168 distal from the side surface 166 are rounded. A height of the ear 168 is greater than a thickness of a main body (not labeled) of the light guide plate 16, and a bottom surface (not visible) of the ear 168 is coplanar with the bottom surface 164 of the light guide plate 16. That is, a top surface (not labeled) of the ear 168 is higher than the light emitting surface 162 of the light guide plate 16. The light guide plate 16 having the ears 168 can for example be made from polycarbonate (PC) or polymethyl methacrylate (PMMA), and can be manufactured by an injection molding method.

The frame 17 is generally rectangular. The frame 17 includes a supporting board 170, and a U-shaped first side wall 171 and a U-shaped second side wall 172 both connected with the supporting board 170. The supporting board 170 is generally a rectangular frame portion forming part of the frame 17. Portions of the supporting board 170 perpendicularly extend inward from inner surfaces (not labeled) of the first side wall 171 and the second side wall 172. Thus the supporting board 170 defines a rectangular space (not labeled) for accommodating the first BEF 13, the second BEF 14, the diffusing film 15, and the light guide plate 16. A plurality of protrusions 173 are formed along an inner surface (not labeled) of the supporting board 170 at one end of the frame 17. In the illustrated embodiment, there are three protrusions 173. The protrusions 173 are parallel to each other, and extend into the rectangular space. The light emitting diodes 18 can be respectively disposed in a series of spaces defined between every two adjacent protrusions 173 and between endmost protrusions 173 and corresponding portions of the supporting board 170. The frame 17 further defines two pairs of notches 174 positioned at two opposite long inner sides (not labeled) of the supporting board 170 respectively. Each notch 174 corresponds to a respective one of the ears 168 of the light guide plate 16. A depth of each notch 174 is substantially equal to the height of each ear 168. The frame 17 is preferably made from white polycarbonate or plastic, or may be made from any other suitable material.

The first side wall 171 has a generally asymmetrical U-shape, and includes a first arm 171a, a second arm 171b, and a third arm 171c. The first arm 171a extends along a corresponding first long side of the frame 17. The second arm 171b and the third arm 171c respectively extend along two opposite short sides of the frame 17. The second arm 171b is longer than the third arm 171c. The second side wall 172 has a generally asymmetrical U-shape, and includes a fourth arm 172a, a fifth arm 172b, and a sixth arm 172c. The fourth arm 172a extends along a corresponding second long side of the frame 17, and is parallel to and opposite from the first arm 171a. The fifth arm 172b and the sixth arm 172c respectively extend along the two opposite short sides of the frame 17. The sixth arm 172c is adjacent to the protrusions 174 of the supporting board 170, and is longer than the fifth arm 172b. The second arm 171b of the first side wall 171 is aligned with the fifth arm 172b of the second side wall 172. The third arm 171c of the first side wall 171 is aligned with the sixth arm 172c of the second side wall 172.

Figure 2:
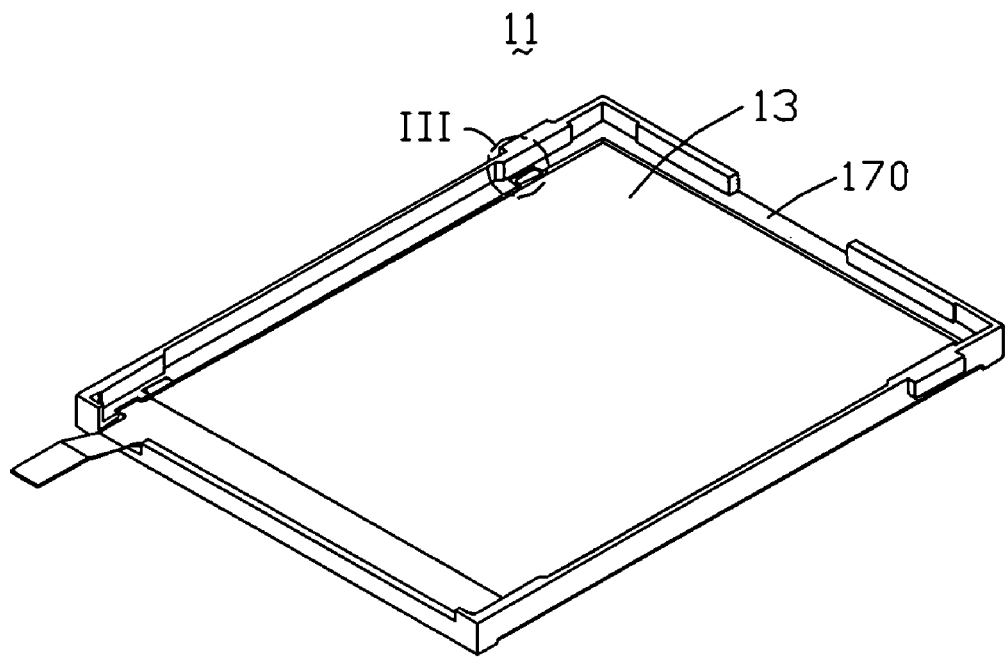
FIG. 2 is an assembled view of the backlight module of FIG. 1, but omitting the masking tape thereof.

Referring also to FIG. 2, when the liquid crystal display 1 is assembled, the liquid crystal panel 10, the masking tape 12, the first BEF 13, the second BEF 14, the diffusing film 15, the light guide plate 16, and the light emitting diodes 18 are received in the frame 17. The ears 168 of the light guide plate 16 are respectively received in the notches 174 of the frame 17. Because the depth of each notch 174 is substantially equal to the height of each ear 168, the top surfaces of the ears 168 are coplanar with the top surface of the supporting board 170. Edge portions of the supporting board 170 and adjacent edge portions of the first BEF 13 are adhered by a bottom side of the masking tape 12. Edge portions of the liquid crystal panel 10 are adhered by a top side of the masking tape 12. Because the top surfaces of the ears 168 are coplanar with the top surface of the supporting board 170, the top surfaces of the ears 168 are adhered by the bottom side of the masking tape 12.

With the above-described configuration, areas of the ears 168 of the light guide plate 16 are adhered by the masking tape 12. This means that the light guide plate 16 is stabilized by the masking tape 12, in addition to the other components adhered and stabilized by the masking tape 12. The result is that the backlight module 11 has improved mechanical stability.

Figure 4:
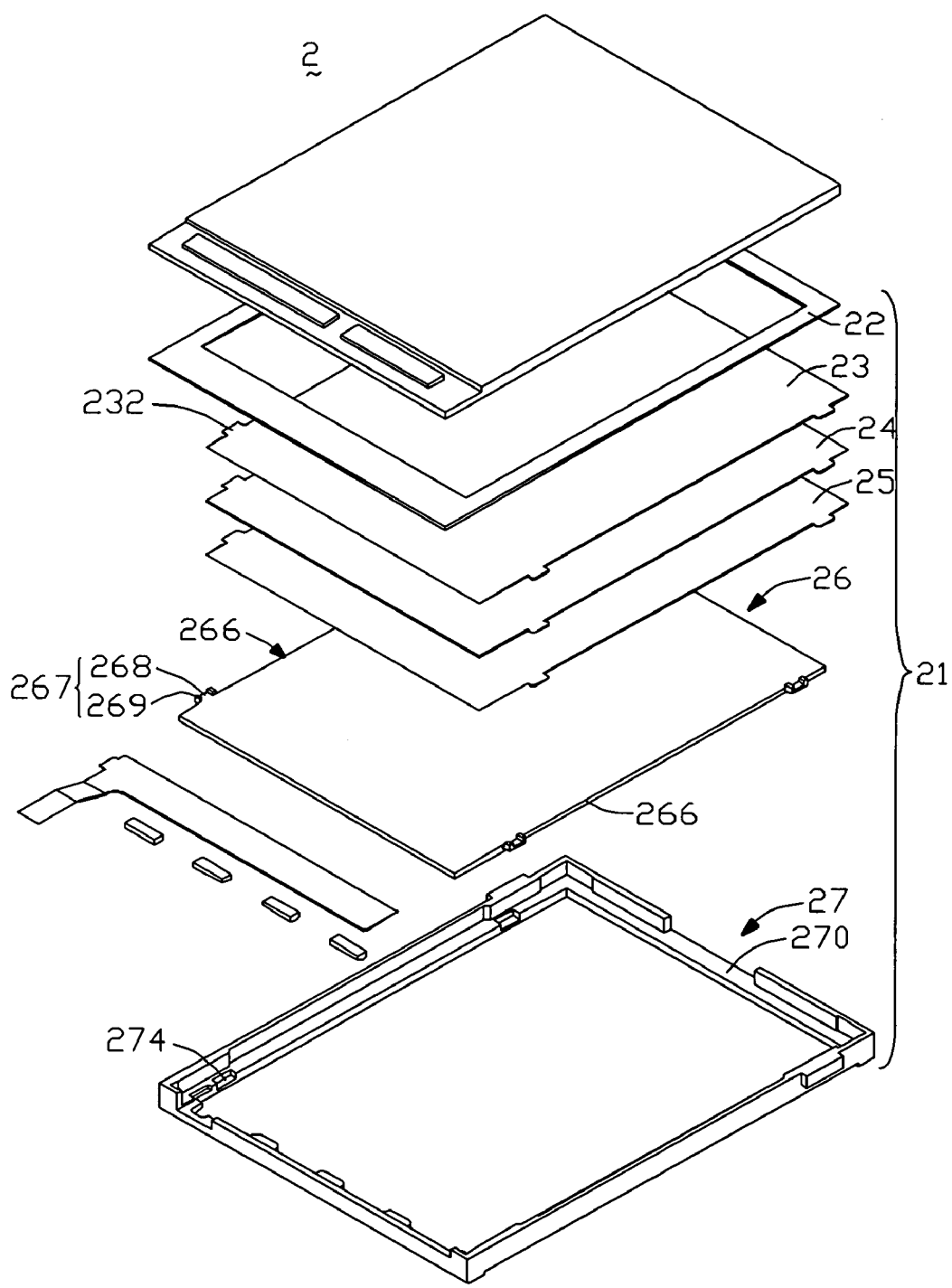
FIG. 4 is an exploded, isometric view of a liquid crystal display according to a second embodiment of the present invention, the liquid crystal display including a liquid crystal panel and a backlight module, the backlight module including a frame-shaped piece of masking tape and three optical films below the masking tape.

Referring to FIG. 4, a liquid crystal display 2 according to a second embodiment of the present invention is shown. The liquid crystal display 2 is similar to the liquid crystal display 1. However, the liquid crystal display 2 includes a backlight module 21. The backlight module 21 includes a frame-shaped piece of double-sided adhesive masking tape 22, a first BEF 23, a second BEF 24, a diffusing film 25, a light guide plate 26, and a frame 27, arranged generally in that order from top to bottom. The frame 27 receives the masking tape 22, the first BEF 23, the second BEF 24, the diffusing film 25, and the light guide plate 26.

The light guide plate 26 includes a pair of first ears 267 outwardly extending from each of two opposite side surfaces 266 thereof. Each first ear 267 includes a base 268, and a pair of protrusions 269 upwardly extending from a top surface (not labeled) of the base 268. In the illustrated embodiment, the protrusions 269 are located at two opposite short edges of the base 268, and are perpendicular to the side surface 266. The first BEF 23, the second BEF 24, and the diffusing film 25 each include two pairs of second ears 232, corresponding to the two pairs of first ears 267 of the light guide plate 26. An area of each second ear 232 is smaller than that of each first ear 267. In particular, each second ear 232 can be fittingly received between the protrusions 269 of the corresponding first ear 267.

Figure 5:
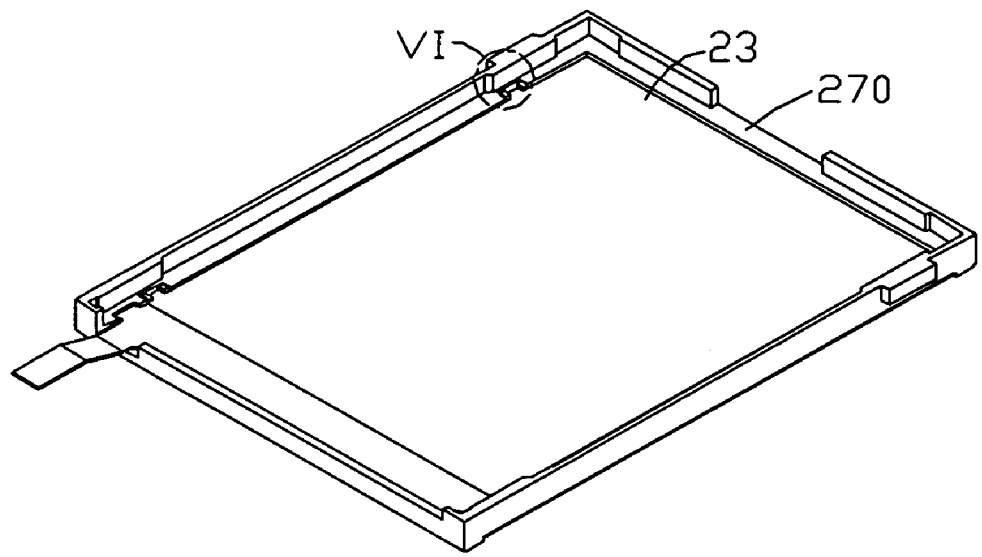
FIG. 5 is an assembled view of the backlight module of FIG. 4, but omitting the masking tape and three optical films thereof.
Figure 6:
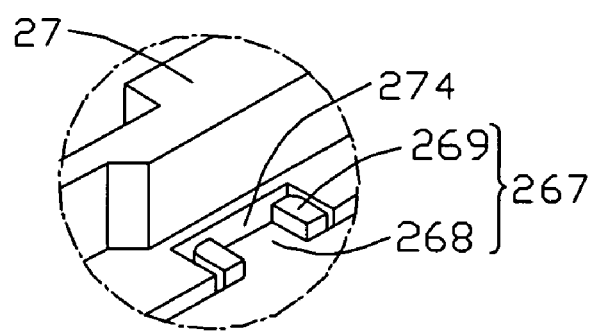
FIG. 6 is an enlarged view of a circled portion VI of FIG. 5.

The frame 27 defines two pairs of notches 274 in a supporting board 270 thereof. Referring also to FIG. 5 and FIG. 6, a depth of each notch 274 is substantially equal to a maximum height of each first ear 267. Further, a combined height of any three adjacent second ears 232 of the first BEF 23, the second BEF 24 and the diffusing film 25 is substantially equal to a height of the protrusions 269 above the base 268 of each first ear 267. Thus when backlight module 21 is assembled, top surfaces (not labeled) of the protrusions 269 of the first ears 267 and top surfaces (not labeled) of the second ears 232 of the first BEF 23 are all substantially coplanar with a top surface (not labeled) of the supporting board 270. The liquid crystal display 2 can achieve advantages similar to those described above in relation to the liquid crystal display 1.

Figure 7:
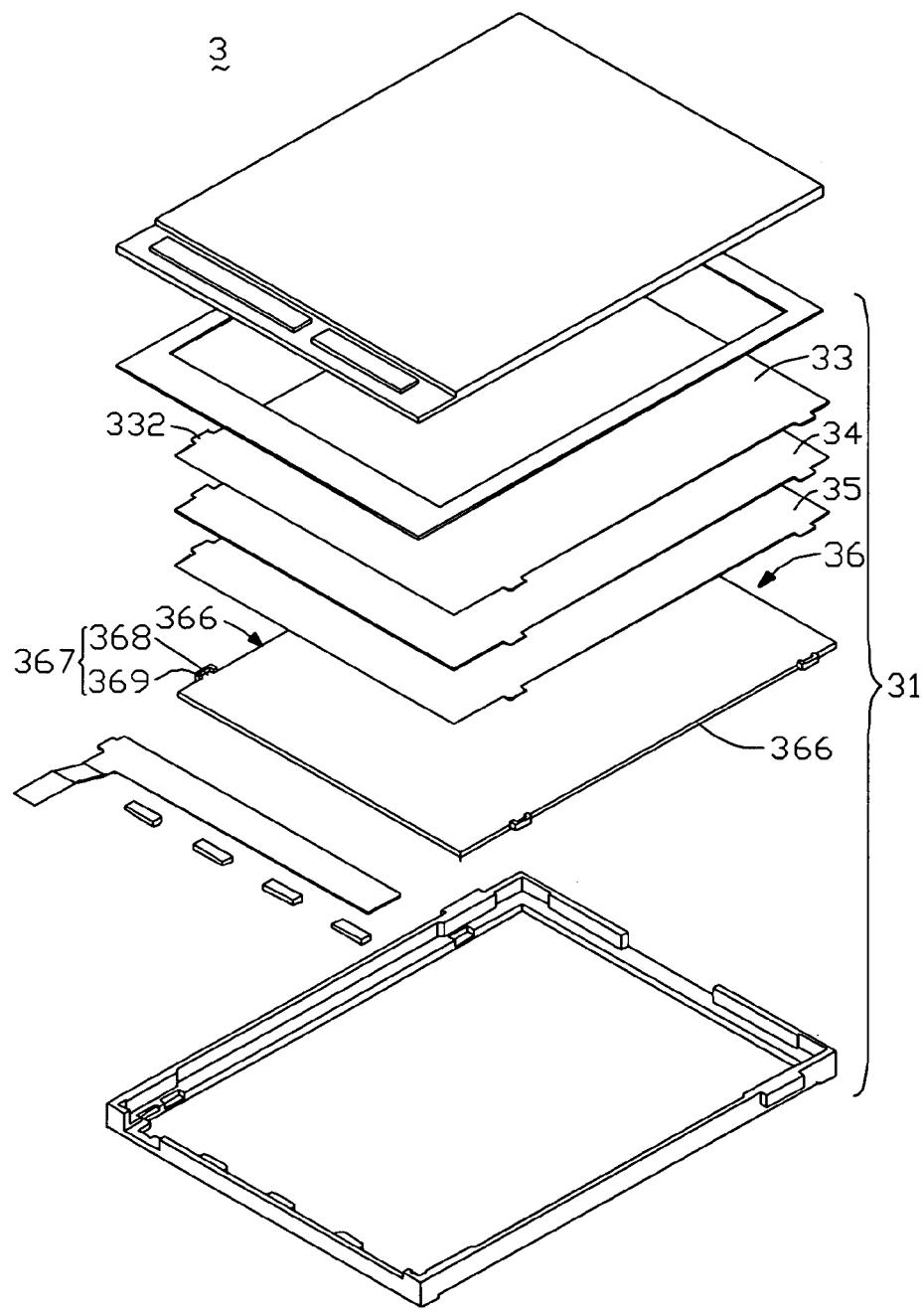
FIG. 7 is an exploded, isometric view of a liquid crystal display according to a third embodiment of the present invention, the liquid crystal display including a liquid crystal panel and a backlight module, the backlight module including a frame-shaped piece of masking tape and three optical films below the masking tape.
Figure 8:
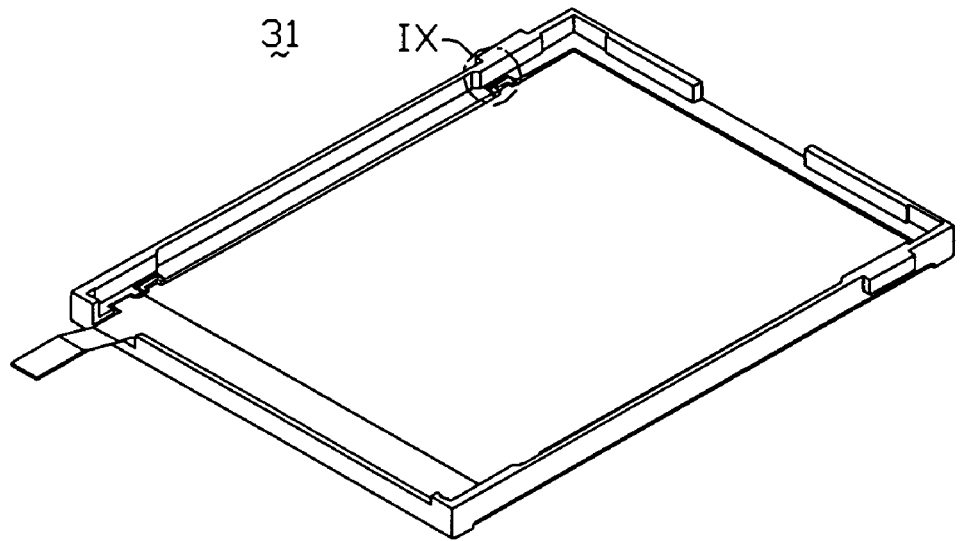
FIG. 8 is an assembled view of the backlight module of FIG. 7, but omitting the masking tape and three optical films thereof.
Figure 9:
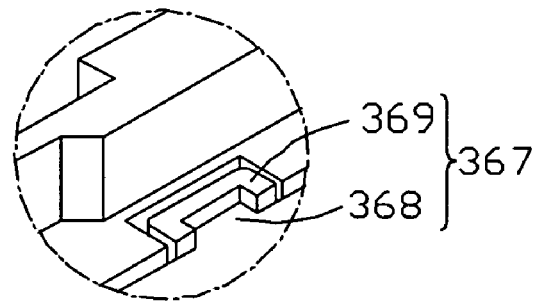
FIG. 9 is an enlarged view of a circled portion IX of FIG. 8.

Referring to FIG. 7, a liquid crystal display 3 according to a third embodiment of the present invention is shown. The liquid crystal display 3 is similar to the liquid crystal display 2. However, the liquid crystal display 3 includes a backlight module 31. The backlight module 31 includes a light guide plate 36. Referring also to FIG. 8 and FIG. 9, a pairs of first ears 367 outwardly extend from each of two opposite side surfaces 366 of the light guide plate 36. Each first ear 367 includes a base 368, and a protrusion 369 integrally extending from a top surface (not labeled) of the base 368. In the illustrated embodiment, the protrusion 369 has a generally symmetrical U-shape. The protrusion 369 includes a main body (not labeled) parallel to the side surface 366, and two arms (not labeled) perpendicularly connected with two ends of the main body respectively. Thus the arms are substantially perpendicular to the side surface 366. A first BEF 33, a second BEF 34, and a diffusing film 35 each include two pairs of second ears 332, corresponding to the two pairs of first ears 367 of the light guide plate 36. An area of each second ear 332 is smaller than that of each first ear 367. In particular, each second ear 332 can be fittingly received between the main body and the arms of the protrusion 369 of the corresponding first ear 367. The liquid crystal display 3 can achieve advantages similar to those described above in relation to the liquid crystal display 2.

Figure 10:
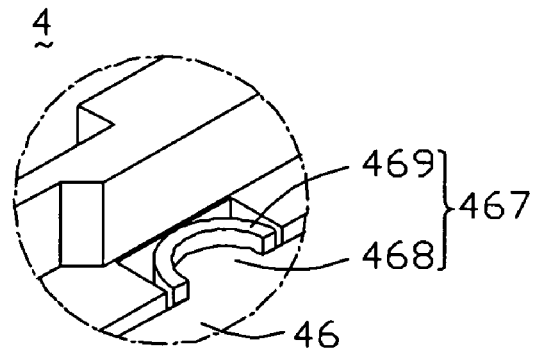
FIG. 10 is similar to FIG. 9, but showing a corresponding view in the case of a liquid crystal display according to a fourth embodiment of the present invention.
Figure 11:
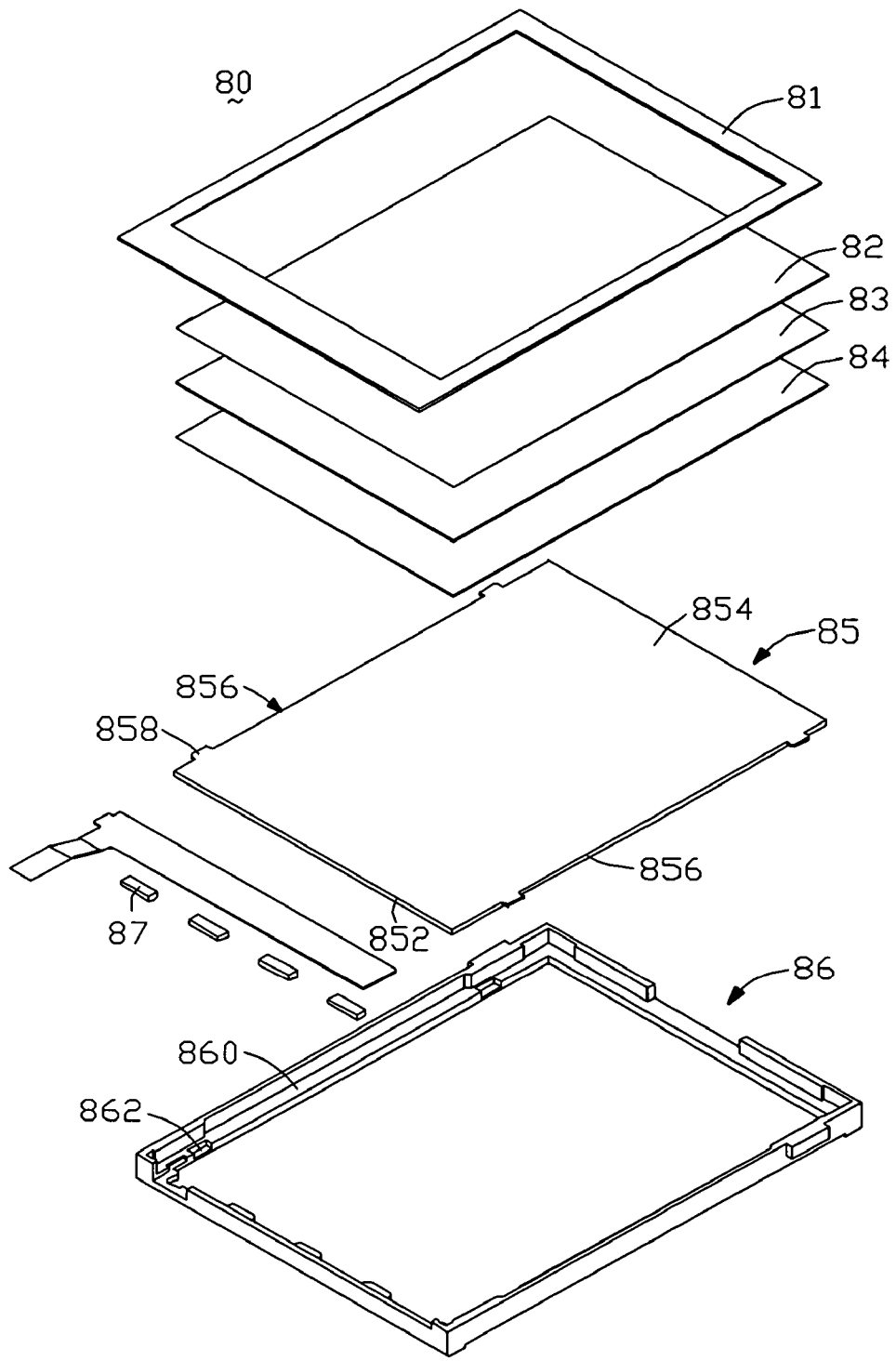
FIG. 11 is an exploded, isometric view of a conventional backlight module.

Referring to FIG. 10, a liquid crystal display 4 according to a fourth embodiment of the present invention is similar to the liquid crystal display 3. However, the liquid crystal display 4 includes a backlight module (not labeled). The backlight module includes a light guide plate 46 having two pairs of first ears 467. Each first ear 467 includes a base 468, and a protrusion 469 extending from a top surface (not labeled) of the base 468. The protrusion 469 has a generally semicircular shape, with two opposite ends (not labeled) of the protrusion 469 being substantially perpendicular to a side surface (not labeled) of the light guide plate 46. A first BEF (not shown), a second BEF (not shown), and a diffusing film (not shown) each include two pairs of second ears, corresponding to the two pairs of first ears 467 of the light guide plate 46. The liquid crystal display 4 can achieve advantages similar to those described above in relation to the liquid crystal display 3.

Further or alternative embodiments may include the following. In one example, surfaces of the light guide plate between the light emitting surface and the bottom surface (except of course the light incident surface) can be coated with reflective material for improving a light utilization ratio of the liquid crystal display.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A backlight module comprising:
    a frame comprising a supporting board, the supporting board defining a notch therein;
    a light guide plate received in the frame, the light guide plate comprising:
        a light incident surface;
        a side surface;
        a light emitting surface perpendicularly adjacent to the light incident surface and the side surface; and
        a first ear outwardly extending from the side surface, the first ear being received in the notch and comprising a top surface coplanar with a top surface of the supporting board at the notch, the first ear further comprising a base extending from the side surface and a protrusion extending from a top surface of the base; and
    at least one optical film received in the frame; the at least one optical film having a size corresponding to a size of the light emitting surface, wherein the at least one optical film comprises a second ear corresponding to the protrusion, and the second ear is supported by the base and is fittingly localized by the protrusion.

2. The backlight module in claim 1, wherein the first ear has the shape of a block, and a depth of the notch is substantially equal to a corresponding height of the first ear.

3. The backlight module in claim 1, wherein the base has the shape of a block.

4. The backlight module in claim 1, wherein a top surface of the protrusion is coplanar with the top surface of the supporting board at the notch.

5. The backlight module in claim 1, wherein the protrusion has a symmetrical U-shape.

6. The backlight module in claim 1, wherein the protrusion comprises a main body parallel to the side surface.

7. The backlight module in claim 6, wherein the protrusion further comprises two arms perpendicularly connected with the main arm.

8. The backlight module in claim 7, wherein the arms of the protrusion are substantially perpendicular to the side surface.

9. The backlight module in claim 1, wherein the protrusion has a semicircular shape.

10. The backlight module in claim 1, further comprising a masking tape adhered to the top surface of the supporting board at the notch and the protrusion and the second ear.

11. A liquid crystal display comprising:
    a liquid crystal panel; and
    a backlight module located adjacent to the liquid crystal panel, the backlight module comprising:
        a frame comprising a supporting board, the supporting board defining a notch therein;
        a tight guide plate received in the frame, the light guide plate comprising:
        a light incident surface;
        a side surface;

a tight emitting surface perpendicularly adjacent to the light incident surface and the side surface; and a first ear outwardly extending from the side surface, the first ear being received in the notch and comprising a top surface coplanar with a top surface of the supporting board at the notch, the first car further comprising a base extending from the side surface and a protrusion extending from a top surface of the base; and at least one optical film received in the frame, the at least one optical film having a size corresponding to a size of the light emitting surface, wherein the at least one optical film comprises a second ear corresponding to the protrusion, and the second ear is supported by the base and is fittingly localized by the protrusion.

* * * * *

UNITED STATES PATENT AND TRADEMARK OFFICE
CERTIFICATE OF CORRECTION

PATENT NO. : 7,656,470 B2
APPLICATION NO. : 11/636061
DATED : February 2, 2010
INVENTOR(S) : Chih-Chia Yu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Thirtieth Day of November, 2010

David J. Kappos
*Director of the United States Patent and Trademark Office*